United States Patent
Schwafertz

(10) Patent No.: US 7,594,446 B2
(45) Date of Patent: Sep. 29, 2009

(54) OPERATING DEVICE FOR TESTING TORQUE WRENCHES

(75) Inventor: Rainer Schwafertz, Remscheid (DE)

(73) Assignee: Eduard Wille GmbH CoKG, Wuppertal (DE)

( * ) Notice: Subject to any disclaimer, the term of this patent is extended or adjusted under 35 U.S.C. 154(b) by 0 days.

(21) Appl. No.: 11/998,873

(22) Filed: Nov. 30, 2007

(65) Prior Publication Data

US 2008/0141790 A1 Jun. 19, 2008

(30) Foreign Application Priority Data

Dec. 1, 2006 (DE) .................. 20 2006 018 352 U

(51) Int. Cl.
*G01L 3/00* (2006.01)
(52) U.S. Cl. .................. 73/862.325; 81/467
(58) Field of Classification Search .................. 73/1.09, 73/1.11, 1.12, 862.08, 862.325; 81/467
See application file for complete search history.

(56) References Cited

U.S. PATENT DOCUMENTS

| | | | |
|---|---|---|---|
| 2,411,931 A * | 12/1946 | McVey ........................ 73/1.12 |
| 2,955,454 A | 10/1960 | Husher | |
| 3,456,485 A | 7/1969 | Larson | |
| 3,675,464 A | 7/1972 | Larson | |
| 4,171,647 A * | 10/1979 | Herrgen ........................ 73/854 |
| 4,376,386 A * | 3/1983 | Green ........................ 73/1.12 |
| 4,517,821 A * | 5/1985 | Taggart et al. ................ 73/1.11 |
| 5,099,678 A | 3/1992 | Grabovac et al. | |
| 5,181,425 A | 1/1993 | Livingston | |
| 5,353,654 A * | 10/1994 | Lin ........................ 73/865.9 |
| 5,703,277 A * | 12/1997 | Grabovac ................ 73/1.12 |
| 6,609,407 B1 * | 8/2003 | Tambini ................ 73/1.11 |

FOREIGN PATENT DOCUMENTS

| | | |
|---|---|---|
| DE | 76 35 688 U | 10/1977 |
| DE | 26 51 576 A1 | 5/1978 |
| DE | 196 37 540 A1 | 3/1998 |

* cited by examiner

*Primary Examiner*—Lisa M Caputo
*Assistant Examiner*—Freddie Kirkland, III
(74) *Attorney, Agent, or Firm*—Lawrence G. Fridman

(57) ABSTRACT

An operating device for testing torque wrenches is formed with a carrier for fixing a torque wrench to be tested. A transducer is coupled to the head portion of the torque wrench. A grip holder is provided for fixing the grip of the torque wrench. A deflecting mechanism is adapted for the generation of a torque on the head portion of the torque wrench to be tested.

18 Claims, 1 Drawing Sheet

OPERATING DEVICE FOR TESTING TORQUE WRENCHES

FIELD OF THE INVENTION

The invention relates to testing equipment in general, and more specifically it relates to operating devices for testing torque wrenches.

BACKGROUND OF THE INVENTION

A torque wrench is typically used to exert a given torque on connecting elements, such as screws or nuts. For this purpose, torque wrenches comprise a wrench lever with a grip and a wrench head, referred to as head portion hereafter. Often, a coupling in the form of a square fitting is provided at the wrench head to receive a insert tool. Different insert tools for rotating screws or nuts can be fixed on the square fitting. A force exerted on the grip by a user in the operating direction is transferred from the wrench lever to the wrench head and generates a torque on a screw or nut through the insert tool. In order to measure the exerted torque the torque wrench is provided with a measuring device. With further devices the measured torque is continuously displayed or the reaching of a given torque is indicated.

The measuring device of a torque wrench is normally subjected to common wear and tear symptoms. The torque wrench must be calibrated from time to time with an operating device to check if a torque measured with the measuring device is the same as an exerted torque. A carrier with a transducer and a grip holder is provided in the operating device. The head portion of the torque wrench is tightly coupled to the transducer, for example with the square fitting. The grip of the torque wrench is fixed by the grip holder.

A torque is exerted on the head portion of the torque wrench by a deflecting mechanism. This torque is measured by the transducer and displayed in a display provided at the operating device, for example at the transducer. The torque displayed by the torque wrench or a torque set for the torque wrench for a release can be tested by comparison with the torque displayed on the display.

With known operating devices for testing torque wrenches different deflecting mechanisms for the generation of a torque are used. In principal two ways are possible for the generation of a torque at the head portion of a torque wrench. Either the transducer is rotatably fixed to the carrier and the grip holder is immoveable fixed to the carrier or, in the other way, the transducer is immoveable fixed to the carrier and the grip holder is moveably mounted on the carrier.

The operating devices according to the prior art having grip holder which is moveable with respect to the carrier comprise a linear actuator with a spindle and a crank. By rotating the spindle by means of the crank the grip holder and thereby also the grip of the torque wrench are deflected perpendicular to the carrier. Thereby a torque is exerted on the head portion which is fixed to the transducer. The torque wrench is tilted about an axis of the transducer. The grip is moved in a circle rather than the linear movement of the grip holder and it must, therefore, be moveably held in the grip holder.

Such an assembly has the disadvantage that the origin of force changes during the testing procedure. The more the torque wrench is tilted the more the origin of force moves to the outer end of the grip. Thereby the lever length is changed during the testing procedure. This circumstance causes measuring errors when a torque wrench is tested.

Furthermore the grip holder must be shifted on the carrier together with the linear actuator in order to adapt the operating device for torque wrenches having a different size. Accordingly, the linear actuator must be very large for very large torque wrenches. Thereby the set-up of such an operating device is complicated and difficult to handle.

The disadvantage of different origins of force is avoided with the known operating devices for testing a torque wrench where the transducer is rotatable with respect to the carrier. The torque wrench is locked with the head portion at the transducer and the grip is fixed by the grip holder. In one modification a torque is exerted on the transducer and the head portion through a crank and a gearing. It is disadvantageous with such operating devices that there is a gearing having many complex individual components. The gearing causes the operating device to be large, especially in height.

In a further known embodiment of the operating device the transducer is mounted on a basis having a spindle with a crank fixed thereon as a linear actuator. The carrier is rotatably fixed to the transducer and can be tilted with the crank and the spindle. In such a way a gearing is avoided but the operating device is also assembled with many individual components due to the additional basis. Furthermore the operating device requires much work space due to the basis and the carrier which is tilted as a whole.

SUMMARY OF THE INVENTION

One aspect of the invention relates to an operating device for testing torque wrenches which consists of a carrier for fixing a torque wrench to be tested, a transducer coupled to the head portion of the torque wrench to be tested, a grip holder for fixing the grip of the torque wrench to be tested, and a deflecting mechanism for the generation of a torque on the head portion of the torque wrench to be tested.

According to another aspect of the invention a deflecting mechanism is provided having a deflecting lever acting on the head portion of the torque wrench to be tested, and the carrier is immobile with respect to the deflecting lever.

The invention is based on the principle to use a static carrier with a tightly mounted gripholder and a measurement value receiver rotatably fixed to a deflecting lever for testing a torque wrench. A head portion of a torque wrench to be tested is tightly locked by means of the reception of the transducer while the grip of the torque wrench is counterheld by the grip holder. A torque is exerted on the head portion through the transducer by the force on the deflecting lever. The exerted torque is measured by the measurement value receiver compared to the torque displayed by the torque wrench or to the torque set for the torque wrench.

As the grip holder is not moved during the testing procedure the origin of force at the grip and the point of application, respectively, does not change during the entire testing. Therefore a measurement is possible with the same lever length. The test can be carried out with higher accuracy. Furthermore, there is no gearing or mechanism for tilting the entire carrier needed due to the use of a deflecting lever. An assembly of the operating device according to the invention for testing torque wrenches can be compact and flatly carried out with few individual components. Furthermore, the assembly can be produced with little costs due to the small amount of individual components and is less accident-sensitive.

A preferred embodiment of the operating device for testing torque wrenches comprises a spindle device arranged at the carrier. A driver arranged on a spindle of the spindle device deflects the deflecting lever upon operation of the rotatably supported spindle. Due to the gear reduction of the crank and the spindle an even tightening and a fine adjustment of the torque is possible with a minimum of power by the user. Due to the use of only a small amount of moveable parts the operating device according to the invention can be realized very flatly and compact. It only requires little work space and it is only little accident sensitive and in the need of servicing.

In another embodiment of the operating device the spindle of the spindle device is designed in such a way that it is adapted to be driven by a motor, such as an electromotor. The use of a motor frees the user of the use of a crank and thereby avoids the exhaustion of the user. The user can better concentrate on the testing procedure. Measuring errors due to an in attention of the user, such as different tightening speeds, are avoided. Measuring procedures can be easily automatized with a suitable motor control.

According to a further modification of the operating device of the present invention an adjustably arranged grip holder is provided on the carrier in the longitudinal direction of the torque wrench to be fixed. The grip holder can be adjusted to different torque wrenches having a different length. The operating device can be adapted to torque wrenches having different sizes without much effort. It is ensured, that the origin of force and the point of application, respectively, are always in the middle of the grip. In such a way an exact and reproducible testing of a torque wrench is enabled.

In still another modification of the operating device for testing torque wrenches the grip holder is formed by two unshaped arranged pins or a changeable pin. Two receptions are provided in the grip holder for the changeable pin. The pins enable a quick and uncomplicated fixing of the grip of a torque wrench. Furthermore, the testing of a torque wrench can be carried out in both rotational directions. The grip is held by the corresponding pin.

In still a further modification of the operating device according to the present invention at least one shiftably and/or rotatably supported casing is provided on one of the pins. A torque wrench to be tested is aligned in an exactly perpendicular direction with the casing. Thereby lateral forces are avoided at the transducer during the testing procedure. Lateral forces may cause measuring errors. Such measuring errors are substantially compensated with such a casing. The testing of a torque wrench is optimized.

In a suitable modification of the invention a signal processing unit is comprised which processes the measured signals of the transducer, especially digitizes, stores in a storage and displays them on a display. Processing measured signals enables, for example, to take into account systematic measurement errors during testing. Digitized measured values can be easier processed, displayed and stored. A fine adjustment of the torque for precise testing of a torque wrench can be carried out by the user by continuously displaying exerted torques by means of a display. Storing measured torque values facilitates the protocolling of a testing procedure for the user and enables the archiving of testing procedures with the torques exerted at the head portion of a torque wrench. Releasing torque wrenches can be better tested by storing the maximum exerted torque before its release.

In a preferred embodiment of the invention the transducer is provided with a rotating pin guided in a recess of the carrier. The rotating pin is deflected by the deflecting lever and transmits a torque through the transducer to a head portion of a torque wrench. A compact and unsensitive assembly with low height is possible due to the uncomplicated deflecting mechanism with a small amount of individual components. Furthermore, the operating device according to the present invention can be produced accordingly with little costs.

It has been found to be an advantageous embodiment of the invention if the carrier is extendable. The operating device according to the present invention is also suitable for testing very long torque wrenches due to an extended carrier. When small torque wrenches are tested the device can be set up with small dimensions and therefore requires less work space. Furthermore the transport of the operating device according to the present invention is facilitated.

In a still further embodiment of the operating device according to the present invention the deflecting lever is moveably supported with a driver arranged at the spindle. The deflecting lever can, for example, be moveably arranged between to pins of the driver or a driver pin in an elongated hole of the deflecting lever. Thereby the linear movement of the driver is transferred to the circular movement of the deflecting lever without major design efforts. An assembly of the operating device according to the present invention is possible with only a small amount of components and inexpensive.

An advantageous modification of the present invention provides a horizontal alignment of the operating device with a horizontal deflection of the deflecting lever. In order to exactly test the torque wrench it must be horizontally operated. Only then influences of the weight can be excluded during a testing procedure. Thereby the testing of a torque wrench can be carried out with even higher accuracy due to the horizontal alignment of the operating device.

In a further modification of the invention the deflecting mechanism has the form of a lever chain with several levers and/or comprises a toothed rack in the form of a segment of a circle. With a corresponding power conversion by means of the lever chain or the tooth rack in the form of a segment of a circle the generation of a large torque is easier or the fine application of a torque is possible with higher accuracy. The testing of a torque wrench is facilitated.

DETAILED DESCRIPTION OF THE INVENTION

Figure 1:
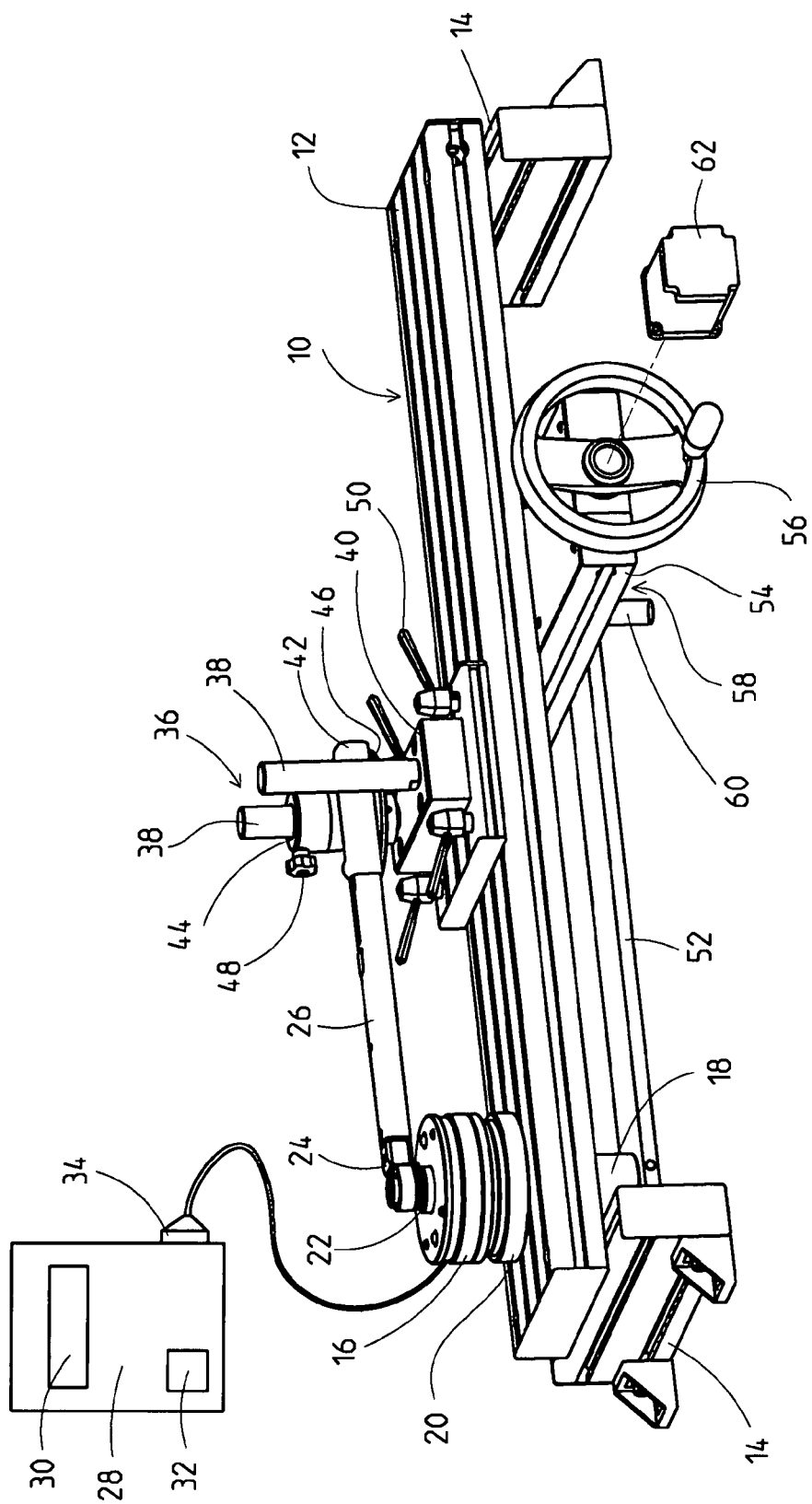
FIG. 1 is a schematic principle view illustrating an operating device for testing torque wrenches.

In referring now to FIG. 1 where numeral 10 denotes an operating device for testing a torque wrench. The operating device comprises a carrier 12 with two pedestals 14 which may be adjustable in height. They ensure a safe and horizontal stand of the operating device 10 and can be screwed to a basis. A transducer 16 is rotatably mounted to a carrier 12. For this purpose the transducer 16 is provided with a rotatable pin 18 which is guided through a recess in the carrier 12 and which is rotatably held at the carrier 12 in a bearing 20. Furthermore a reception 22 is provided at the transducer 16. With the reception 22 a head portion 24 is fixed to the transducer 16 by square fitting. Alternatively receptions 22 can be selected for different tools fixed at the head portion 24.

Torque values measured by the transducer 16 are transmitted to the signal processing unit 28 where they are processed and digitized. Afterwards the measured torque values are displayed on a display 30 and stored in a storage 32 for protocolling and archiving. Measured values can be transmitted to external devices for further processing through an interface 34.

Furthermore, a grip holder 36 with two pins 38 is provided at the carrier 12. The pins 38 are arranged in a u-shape over a bridge 40. Depending on the rotation direction to be tested one of the pins 38 serves as a counterpart for the grip 42 of a torque wrench 26. In an alternative embodiment the grip holder 36 comprises a changeable pin 38 and the bridge 40 comprises two receptions for the pin 38. Depending on the rotation direction the changeable pin 38 is guided to the corresponding reception and forms a counterpart for the grip 42. The corresponding pin 38 is provided with a shiftable and rotatable casing 44 for this purpose. The casing 44 has a plate-shaped abutment surface 46 at its lower end to hold the grip 42 at the beginning of the testing procedure. By means of a bushing (not shown in FIG. 1) with low friction, for example a ball bushing, the casing 44 can be easily shifted on the pin 38 and can be fixed to the pin 38 by means of a clamping screw. The casing enables a vertical fixing of the torque wrench 26 to the transducer 16 for compensation in height. This is important to avoid lateral forces at the transducer 16 and the measuring errors caused thereby.

The bridge 40 is locked with releasable locking means 50, such as, for example, a manually operated clamping lever, at the carrier 12. By releasing the locking means 50 the entire grip holder 36 can be shifted on the carrier 12 and can be adapted to the size of the torque wrench in such a way. The carrier 12 is extendable in order to be able to also test very long torque wrenches 26 with the operating device 10, if necessary.

One end of a deflecting lever 52 is fixed to the rotating pin 18 projecting at the bottom of the carrier 10 to generate a torque. A torque is exerted on the head portion 24 of a torque wrench 26 by deflecting the deflecting lever 52 about the rotating pin 18 and the transducer 16. A spindle device 54 is arranged on the carrier 12 to deflect the deflection lever 52. A rotatably supported spindle 58 is operated with a crank 56 by the user. The spindle 58 drives a driver 60 which is moveably connected to the other end of the deflecting lever 52 and deflects ist. For this purpose the driver 60 is provided with, for example, a pin in an elongated hole in the deflecting lever 52 and with two pins the end of the deflecting lever 52 being arranged therebetween.

Different linear drivers can be provided to operate the deflecting lever 52 instead of the spindle device 54. In a further embodiment of the operating device 10 a motor, such as, for example, an electromotor, is used instead of the crank 56.

For testing a torque wrench 26 with an operating device 10 the casing 44 is shifted on the corresponding pin 38 depending on the rotational direction to be tested. Then the head portion 24 of the torque wrench 26 is coupled to the recess 22 of the transducer 16. After releasing the locking means 50 the grip holder 36 is shifted on the carrier 12 and afterwards locked again to let the pin 38 with the casing 44 counteract the grip 42 of the torque wrench 26 in the middle. Finally the casing 44 is aligned in height by exerting a small torque and is fixed with the clamping screw 48 in such a way that the abutment surface 46 supports the bottom of the grip and holds it perpendicular to the axis of the transducer 16.

After these preparations the real testing of the torque wrench 26 is carried out. By operating the crank 56 or the motor 62 the user exerts an evenly adjustable torque on the head portion 24 of the torque wrench 26 through the spindle device 54, the deflecting lever 52, the rotating pin 18 and the transducer 16. Simultaneously, the exerted torque is measured by the transducer 16 and displayed on the display 30 after processing by the signal processing unit 28.

The user can compare the exerted torque to the torque displayed on the torque wrench 26 at all times and store in the storage 32 if necessary. For releasing torque wrenches 26 the maximum exerted torque is automatically stored in the storage 32. This facilitates the comparison between the torque set at the torque wrench 26 and the torque exerted in the moment of the release.

Afterwards the torque wrench 26 is calibrated and the testing is repeated until a coincidence of the torque values is reached within given tolerance thresholds. The torque values stored in the storage 32 can be transmitted to external devices, such as, for example a printer, through an interface in order to print them out or to archive a testing protocol.

What is claimed is:

1. An operating device for testing torque wrenches with a head portion and a grip extending in a longitudinal direction, the operating device comprising:
    a carrier for fixing a torque wrench to be tested,
    a transducer adapted to have said head portion of said torque wrench to be tested coupled thereto, said transducer adapted to generate measured signals,
    a grip holder for fixing said grip, wherein said grip holder is formed by two pins arranged in a u-shape or by one changeable pin,
    a deflecting mechanism for generating a torque on said head portion wherein said deflecting mechanism is a deflecting lever acting on said head portion and said carrier is immobile with respect to said deflecting lever,
    at least one movable supported casing provided on one of said pins of said grip holder, and wherein said carrier is extendable.

2. An operating device for testing of a torque wrench having a head portion and a grip extending in a longitudinal direction, the operating device comprising:
    an extendable carrier receiving the torque wrench to be tested,
    a transducer adapted for accepting the head portion of said torque wrench, said transducer generating measuring signals during said testing,
    a grip holder associated with said extendable carrier, said grip holder having a pin arrangement for receiving said grip, a longitudinal axis of said pin arrangement extending normally to said carrier;
    a deflecting mechanism for generating a torque on said head portion said deflecting mechanism comprising a deflecting lever acting on said head portion, said carrier being stationary with respect to said deflecting lever; and
    at least one casing associated with said pin arrangement and adapted to support the grip during said testing, said support casing being rotatable about and movable along said longitudinal axis of said pin arrangement, so as to provide at least a rotational motion of said grip and torque wrench about said longitudinal axis.

3. An operating device according to claim 2, further comprising a spindle device comprising a rotatably supported spindle, said spindle device being arranged on said carrier, and a driver arranged on said spindle wherein said driver deflects said deflecting lever upon operation of said rotatably supported spindle.

4. An operating device according to claim 2, comprising a motor, adapted for driving a spindle.

5. An operating device according to claim 4, wherein said motor is an electrical motor.

6. An operating device according to claim 2, wherein said grip holder is an adjustable grip holder on said carrier which is adapted to be adjusted in said longitudinal direction of said torque wrench for the use of torque wrenches having a different length.

7. An operating device according to claim 2, wherein said pin arrangement is formed by two pins arranged in a u-shape or by one changeable pin.

8. An operating device according to claim 2, further comprising a signal processing unit for processing said measured signals of said transducer, especially digitizing, a storage for storing said measured signals, and a display for displaying said measured signals.

9. An operating device according to claim 2, wherein:
said carrier is formed with a recess, said transducer is provided with a rotating pin guided in said recess, and said rotating pin is deflected by said deflecting lever.

10. An operating device according to claim 2, wherein a driver is arranged on said spindle and said deflecting lever is movably supported with said driver.

11. An operating device according to claim 2, wherein a substantially, horizontal alignment of said operating device with a substantially horizontal deflection of said deflecting lever is provided.

12. An operating device according to claim 2, wherein said deflecting mechanism is a lever chain with several levers and/or comprises a toothed rack in the form of a segment of a circle.

13. An operating device according to claim 12, wherein said toothed rack is in the form of a segment of a curvature.

14. An operating device according to claim 2, wherein said pin arrangement comprises at least one changeable pin.

15. An operating device according to claim 2, wherein said torque wrench is aligned in a substantially perpendicular direction relative to the support casing.

16. An operating device according to claim 2, wherein said casing has an abutment surface at a lower end thereof extending transversely to the longitudinal axis of the pin arrangement and adapted for holding the grip during the testing including the rotational motion thereof.

17. An operating device according to claim 2, wherein said pin arrangement is a pin having substantially cylindrical configuration and said support casing has an opening adapted for movable or rotational cooperation with said substantially cylindrical pin.

18. An operating device according to claim 17, wherein said opening is a substantially cylindrical opening passing through a central area of the support casing, and said rotational motion of said support casing including the grip and torque wrench about said longitudinal axis enables the operating device to avoid lateral forces at the transducer and to minimize measuring errors caused thereby.

* * * * *